United States Patent

[11] 3,577,856

[72] Inventor Edward R. Updegraff
4611 Harvard Road, College Park, Md. 20740

[21] Appl. No. 816,457
[22] Filed Feb. 25, 1969
Division of Ser. No. 618,886, Feb. 7, 1967, Pat. No. 3,451,337
[45] Patented May 11, 1971

[54] APPARATUS FOR OFFSET PRINTING
12 Claims, 18 Drawing Figs.

[52] U.S. Cl. .......... 33/184.5, 33/76
[51] Int. Cl. .......... B41b 1/00
[50] Field of Search .......... 33/184.5, 76; 101/(Digest 12), 211, 378, 382

[56] References Cited

UNITED STATES PATENTS 997,418 7/1911 Sayles .......... 33/1
1,761,863 6/1930 Bassist .......... 33/184.5
3,357,107 12/1967 Flower .......... 33/184.5

*Primary Examiner*—William D. Martin, Jr.
*Attorney*—Beveridge & DeGrandi

ABSTRACT: An apparatus for preparing straightedge printing plates for use in an offset printing system, including a light table unit having a light surface with a plurality of guide lines formed thereon in fixed relation to three flat stops mounted on and projecting upwardly from the light surface and positioned to engage and accurately orient a sheet of light-blocking paper over the guide lines in the production of flats used to prepare the printing plates. An assembly surface is provided with three plate guides for positioning a printing plate, and three flat guides are positioned in spaced relation to the plate guides for accurately positioning flats in superimposed relation on a plate which has been positioned by the plate guides. A suitable clamp is provided to releasably retain a flat in superimposed relation on a plate on the assembly surface.

Patented May 11, 1971 3,577,856

4 Sheets-Sheet 1

INVENTOR.
EDWARD R. UPDEGRAFF
BY Brauner, Schuyler & Beveridge
ATTORNEYS

*INVENTOR.*
EDWARD R. UPDEGRAFF
BY
Browne, Schuyler & Beveridge
ATTORNEYS

*INVENTOR.*
EDWARD R. UPDEGRAFF
*BY* *Browne, Schuyler & Beveridge*
ATTORNEYS

Patented May 11, 1971 3,577,856

4 Sheets-Sheet 4

*INVENTOR.*

EDWARD R. UPDEGRAFF

BY *Browne, Schuyler & Beveridge*

ATTORNEYS

APPARATUS FOR OFFSET PRINTING

This application is a division of my copending application Ser. No. 618,886, filed Feb. 27, 1967, now U.S. Pat. No 3,451,337.

METHOD AND APPARATUS FOR OFFSET PRINTING

This invention relates to a method and apparatus for preparing straightedge plates for use in offset printing presses, and for accurately controlling the position of the image printed by such presses.

In the art of offset printing, it is conventional, indeed essential, the meticulous accuracy be employed on the light table in the creation of the flats (an assemblage of light-blocking paper and photographic negatives produced on a lithographic camera from type proofs, art work, photos, or the like) that are used for burning the negative images on plates which are subsequently installed on offset presses to reproduce the images on paper with ink. The production of such flats, and their use in the production of offset printing plates, is disclosed and described in considerable detail in my prior U.S. Pat. No. 3,170,245.

In the past, it has not been customary to attempt to preserve the initial accuracy that is essential in creating the flats, except where two or more flats are used to produce one complete image on a plate. For this exception, the method conventionally employed consists of installing a number (usually three or four) of squares of adhesive material having ½-inch-diameter holes in them on each flat at spaced positions thereon, with the holes in the squares on the several plates being in precise register, while the flats are in exact register position on the light table. Before the plate is burned, a like number of ½-inch-diameter adhesive discs are installed on the plate in positions to correspond with the holes in the first flat to be burned on the plate. After the first images have been burned on the plate, the flat is carefully removed in a manner that will not disturb the position of the discs on the plate. Subsequent flats are then carefully placed in position on the plate with the holes in the squares being exactly fitted around the discs which remain on the plate. When the press is small and the complete flat image is large, a problem often arises because of a lack of available blank image area on the flat for installation of the squares, frequently making it necessary to improvise temporary extensions of both the flat and the plate to provide an area to position the squares and the plate discs. This method is cumbersome, often inaccurate, and always time consuming.

After a plate has been burned and chemically treated in the conventional manner to transfer the image to the plate, the plate is then installed on the press and a few sheets are run through the press to determine the exact position of the image reproduced on the paper. Accurate measurements are then taken, and the necessary adjustments are made to the press paper guides, plate cylinder or plate segment to correctly position and orient the image on the printed sheet. Very often it is necessary to make a twist movement of the image on the paper to properly orient the image on the paper; however, on many existing offset presses it is not possible to make a twist adjustment of the lead edge paper guides, in which instances it is necessary to release the plate completely at the lead and tail edges and to physically twist the plate position on the cylinder. These trial-and-error image-positioning operations must be repeated as necessary to obtain the required image position and orientation on the paper, with the result that a substantial amount of press time is consumed in performing and repeating these trial-and-error positioning operations.

Further, after the first color of a multiple color job has been printed, this trial-and-error image positioning step must be repeated for all subsequent colors employed in the finished job. Regaining the precise accuracy of the image position on the printed paper that was an essential ingredient in the creation of the flats on the light table is frequently a difficult and time-consuming task.

In addition, when a job of two or more colors are running on an offset press and before the press color run is completed, it is not an uncommon occurrence for the image on the plate, or a part of it, to become weak or to disappear completely. When this happens a new plate must be made and installed on the press to replace the faulty plate. All of the time-consuming operations that were necessary for precise image position on the paper at the beginning of the press color run must now be repeated.

Similarly, when a job is running on an offset press, and before the run is completed, it sometimes happens that a mechanical failure of the press occurs which is not necessarily related to the image position control, but making it necessary to move the plate cylinder or plate segment to enable accessibility for making the repair. After the repair has been made, it is again necessary to repeat some or all of the time-consuming image-positioning adjustments.

It is, therefore, an object of the present invention to provide a new and improved method for preparing straightedge plates for use on offset printing presses whereby the conventional time-consuming press adjustments now necessary for obtaining perfect positioning and orientation of the image on the printed paper are eliminated.

It is another object of the present invention to provide such a method whereby the conventional time-consuming press adjustments now necessary for obtaining perfect registration of the various color images of a multiple color-printing job are eliminated.

It is a further object of the present invention to provide a new and improved apparatus for preparing straightedge plates for use on offset printing presses whereby the position and orientation of the image printed on the paper can be exactly predetermined and controlled, and which eliminates the necessity for any press adjustments for this purpose.

It is another object of the present invention to provide such an apparatus whereby the conventional time-consuming press adjustments now necessary for obtaining perfect registration of the various color images printed on a sheet of paper in a multiple color-printing job are eliminated.

It is another object of the present invention to provide an improved offset printing press including precision guide means whereby a straightedge offset plate can be precision installed in a positive and exact position on the plate cylinder or plate segment of the press.

It is another object of the present invention to provide such a press wherein the maximum image size printing position of the plate cylinder or plate segment can be quickly and exactly returned to after it has been necessary to remove the plate cylinder or plate segment from this position on the master cylinder or plate segment wheel.

In the attainment of the foregoing and other objects, an important feature of the invention resides in creating the flats on a specially constructed light table having accurately positioned guidelines formed on its upper surface. These guidelines include lines corresponding to the maximum image limits of the press and a set of accurate scales corresponding to the scales on the freeboard of those presses where such scales are provided. Three rigid stops are mounted on and project upwardly from the upper surface of the light table in fixed, spaced relation to the guidelines. The stops are positioned so that the lead edge of a sheet of light-blocking paper employed to make the flats engages two of the stops and one side edge of the sheet engages the third stop. Thus, the stops form a three-point reference to accurately position the sheet with respect to the guidelines and the scales on the light table.

Preferably the lead and tail edges of the light-blocking sheet are reinforced so that these edges will not become distorted during the preparation of the flat, or during handling of the flat subsequent to its preparation as during assembly with a straightedge plate or during storage. This may be accomplished by securing a strip of stable, yet comparatively flexible opaque plastic material along the lead and tail edges of the sheet of light-blocking paper, with the lead edge reinforcing strip actually engaging the three flat stops on the light table. To clearly distinguish the lead and tail edges of the flats, and of any plates developed therefrom, a portion of the tail edge reinforcing strip is removed in the area outside the maximum image area of the press.

With the sheet of light-blocking material positioned on the light table in three-point contact with the flat stops, the photographic negatives employed to make the flat are secured to the sheet, using the guidelines an scales to position and orient the negatives. The flat is then completed by removing a portion of the sheet in the area where it is desired for light to penetrate the photographic negative to form an image on the light-sensitive surface of the straight edge plate.

A straight edge plate is accurately positioned on the surface of an assembly unit by placing its lead edge in contact with a pair of spaced plate guides and one side edge in contact with a third plate guide. With the plate held in this position, the flat is superimposed on the plate and accurately positioned thereon by three flat guides positioned to contact the flat at the same points at which the flat stops on the light table engaged the sheet. With the plate and the flat held in their respective positions on the assembly surface, they are releasably secured together by double-faced adhesive tape. The assembly is then removed, and the image from the flat negative is developed on the plate in a manner well known in the offset printing art.

The plate with the image thereon is then precision installed on the plate cylinder or plate segment of the offset printing press and accurately positioned thereon by three fixed plate stops on the plate cylinder or plate segment. The plate stops are positioned to engage the plate at the same points at which the plate guides on the assembly surface engage the plate.

While the flat guides on the assembly unit engage the flat at the same points which are engaged by the flat stops on the light table unit, said plate guides on the assembly unit engage the plate at the same points which are engaged by the plate stops on the plate cylinder or plate segment, the flat guides on the assembly unit may be adjusted relative to one another to thereby adjust the position and orientation of the flat image on the plate so that the image when printed on the paper will be parallel with the lead edge of the paper, and will be in the exact position on the paper that was predetermined on the light table when the negatives were assembled on the light-blocking paper. Adjustment of the assembly unit flat guides is an initial one that need not be repeated after the assembly unit flat guides have been adjusted to a particular press. Since the flat stops are fixed with respect to the guidelines and scales on the light table and the plate stops are fixed on the cylinder or plate segment, these adjustable assembly unit flat guides constitute the means for compensating for any and all press manufacture discrepancies and imperfections.

In a preferred apparatus according to the present invention, the guidelines, scales and flat stops are carried on a separate thin sheet of flexible, dimensionally stable, transparent material such as a standard sheet of 0.0082 inch thick transparent acetate. This separate light table unit may then be releasably secured to an, in affect, become a part of any standard light table.

The preferred apparatus of the present invention also includes an assembly unit including a perforated or porous top having a substantially planar surface. Three plate guides are mounted on and project upwardly from the assembly top surface to provide a three-point position reference to accurately position a straight edge offset printing plate on the top surface of the assembly unit. A chamber mounted on the back of the assembly unit top is connected to a vacuum source to apply a vacuum to the lower surface of a straightedge plate which has been positioned on the assembly unit top surface to firmly hold the plate in exact guide position. Preferably, the plate stops are retractable beneath the surface of the assembly unit, thereby eliminating any interferences with the assembly of a flat onto a plate on the assembly unit.

Three flat guides are also provided on the surface of the assembly unit, with the flat guides being positioned relative to one another corresponding to the spacing of the flat stops on the light table unit. The flat guides are mounted on the assembly unit for adjustment relative to the position of the plate guides so that the position of an image carried by a flat may be varied with respect to a plate positioned on the assembly unit. A suitable clamping device is provided on the assembly unit for releasably clamping a flat in superimposed position on a plate on the assembly unit. The clamping device leaves the corners of the flat exposed so that they may be lifted to permit the flat to be releasably assembled to the plate by double-faced adhesive.

Other objects and advantages of the invention will become apparent from the following detailed description, taken with the drawings, in which.

Figures 15, 16, 17, 18:
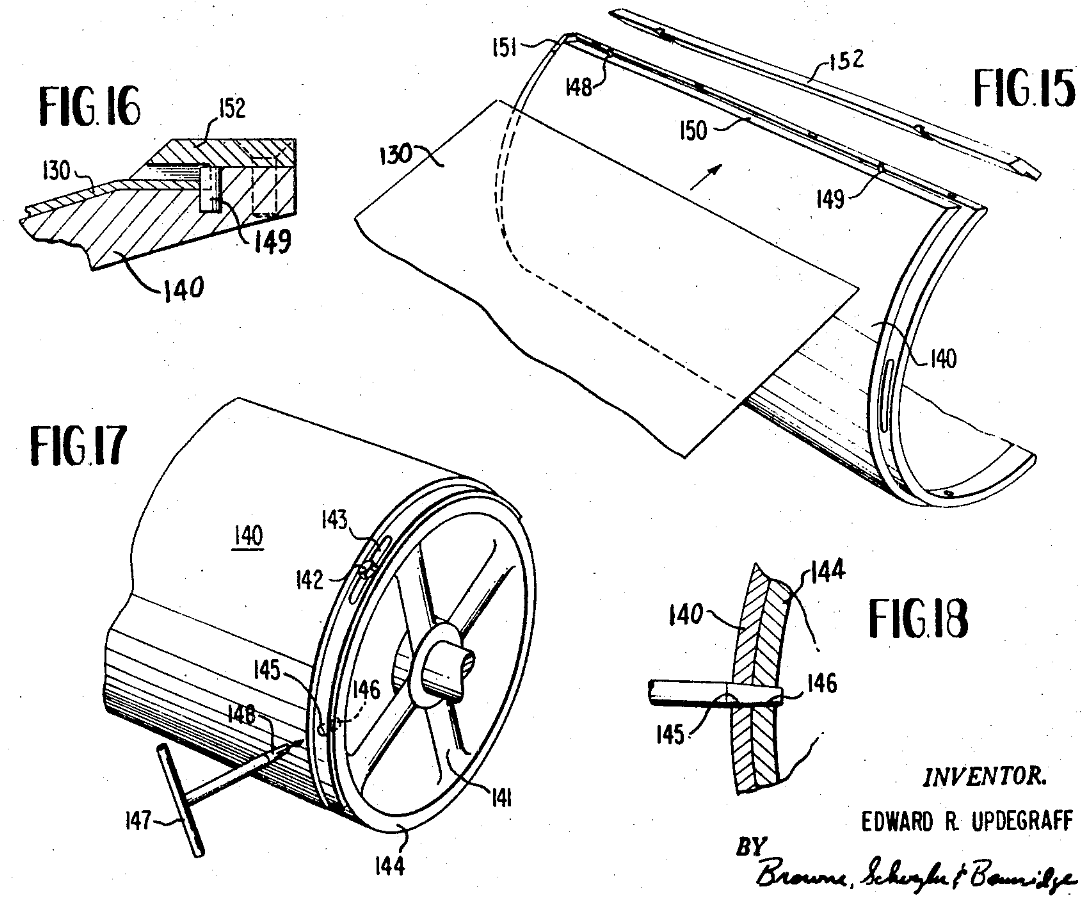
FIG. 15 is a perspective view illustrating a straightedge plate being installed on the plate cylinder or plate segment of an offset printing press and illustrating the position of the plate stops on the plate cylinder or plate segment.
FIG. 16 is a fragmentary sectional view showing a plate clamped in position in contact with the plate stops of an offset printing press.

FIG. 17 is a fragmentary perspective view of a plate cylinder or plate segment mounted on the master cylinder or plate segment wheel of a commercial offset printing press and illustrates a means for precise positioning of the plate cylinder or plate segment on the master cylinder or plate segment wheel in exact maximum image size printing position; and FIG. 18 is an enlarged fragmentary sectional view further illustrating the means for precise positioning of the plate cylinder or plate segment on the master cylinder or plate segment wheel.

Referring now to the drawings in detail, a light table layout unit 10 is shown secured to the upper surface 11 of a conventional light table 12 by strips of adhesive tape 13. The light table layout unit 10 is made from a sheet 14 of relatively thin, transparent, dimensionally stable material such as a standard sheet of transparent acetate 0.0082 inch thick, so that the unit may be secured onto the top surface and, in effect, become a part of the light table unit. A series of horizontal and vertical lines are formed on the sheet 14, with the horizontal line 15 corresponding to the lead edge of a sheet of paper to be printed on an offset printing press. The tail horizontal line 16 and the vertical lines 17, 18 cooperate with the lead line 15 to define a rectangle corresponding to the maximum image limits of the press with which the unit is to be used. A vertical centerline 19 is provided with an accurate linear scale extending from the lead line 15 to the tail line 16. Similarly, a horizontal line 20 extending in fixed parallel relation to the lead line 15 is provided with linear scales extending from the centerline 19 to the vertical impression limit guidelines 17, 18.

A pair of flat stops 21, 22 are rigidly mounted on the sheet 14 at positions spaced above the lead guidelines 15, with one of the stops being positioned on each side of the centerline 19 and spaced a substantial distance therefrom. A third flat stop 23 is rigidly mounted on the transparent sheet 14 at a point spaced vertically between the lead guideline 15 and the flat stops 21, 22 and laterally outboard of the vertical side guideline 18. The flat stops 21, 22, and 23 provide a fixed three-point reference with respect to the guidelines on the sheet 14.

To prepare a flat on the light table unit described above, a sheet of light-blocking paper 25 is secured to the upper surface 11. Sheet 25 has its lead and tail edges 26, 27 respectively, reinforced by strips of opaque flexible plastic material 28, 29 secured therealong by adhesive tape strips 30. Triangular corner portions are removed from the tail edge reinforcing strip 29, in the area outside the maximum image area of the press, as indicated at 42. The sheet 25 is positioned on the unit 10 with the lead edge 26 in contact with the flat stops 21, 22 and one side edge 31 of the plastic reinforcing strip 28 engaging the guide stop 23. The sheet 25 is secured in this position by strips of adhesive tape 32, 33. The job measurements are then taken utilizing the scales on the light table unit which are easily legible through the sheet 25, and ruled on the flat with fine lines. By securing the light table unit 10 on the light table with the centerline 19 parallel to the side edge 34 of the light table 12, a conventional T-square 35 may advantageously be used in laying out the job measurements.

Figure 1:
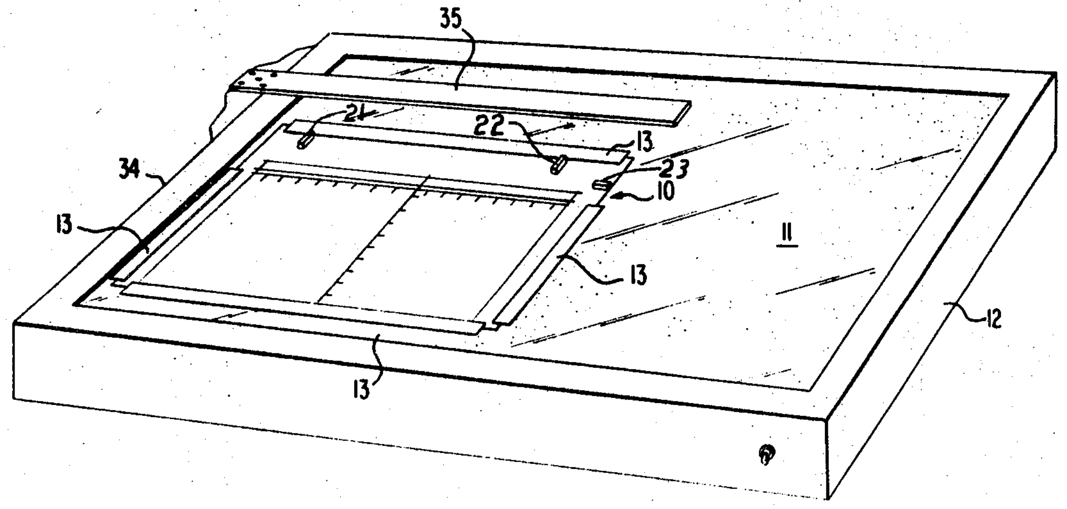
FIG. 1 is a perspective view of a light table unit according to the present invention mounted on a standard light table.
Figure 2:
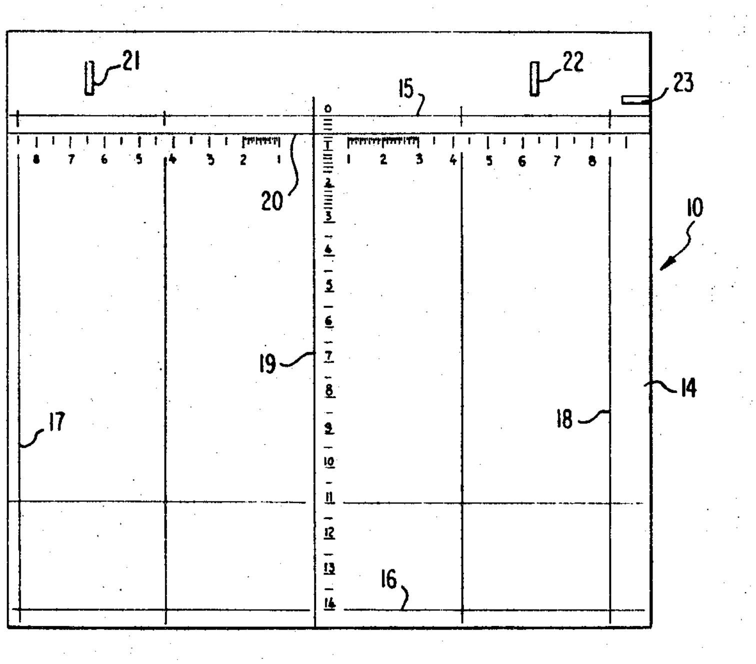
FIG. 2 is a top plan view of the light table unit shown in FIG. 1.
Figure 3:
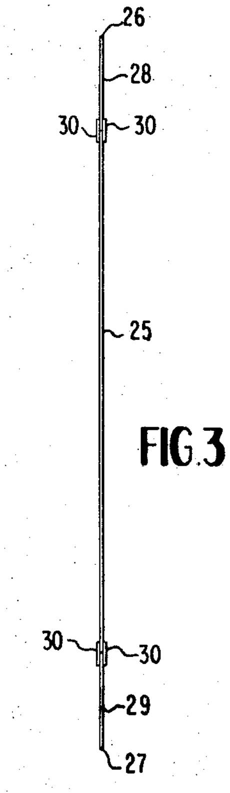
FIG. 3 is a side elevation view of a flat prepared in accordance with the method of this invention.
Figure 4:
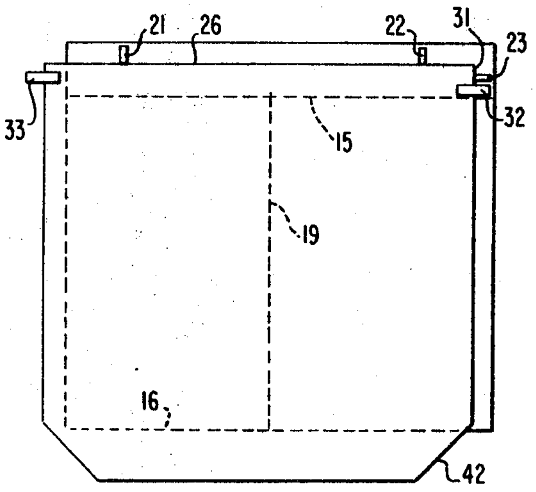
FIG. 4 shows a sheet of light-blocking material attached to the light table unit as an initial step in the method of the present invention.
Figure 5:
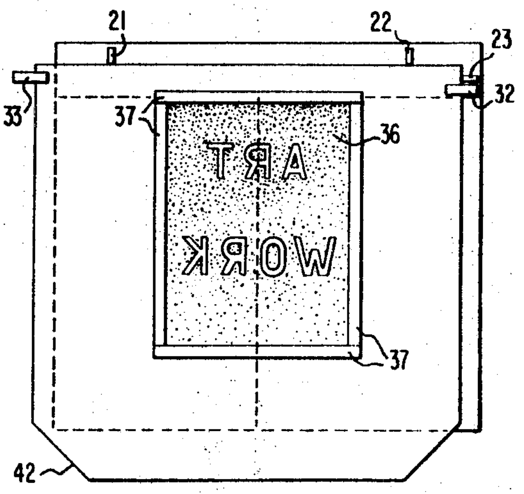
FIG. 5 is a view similar to FIG. 4 and showing a photographic negative secured onto the sheet of light-blocking material in position determined by the guidelines the scale of the light table unit.
Figure 6:
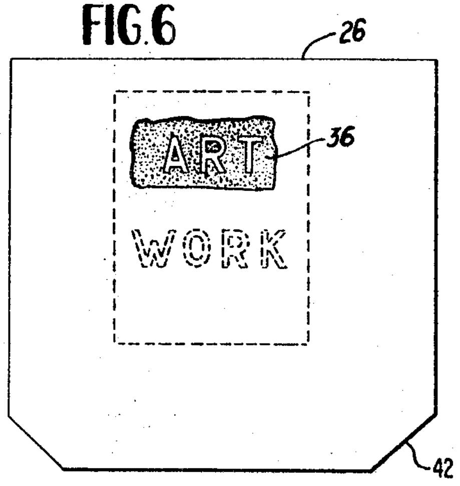
FIG. 6 shows the flat paper and negative of FIG. 5 turned over with a portion of the flat paper shown cut away to expose that portion of the flat negative where it is desired to permit exposure light to penetrate the negative.
Figure 7:
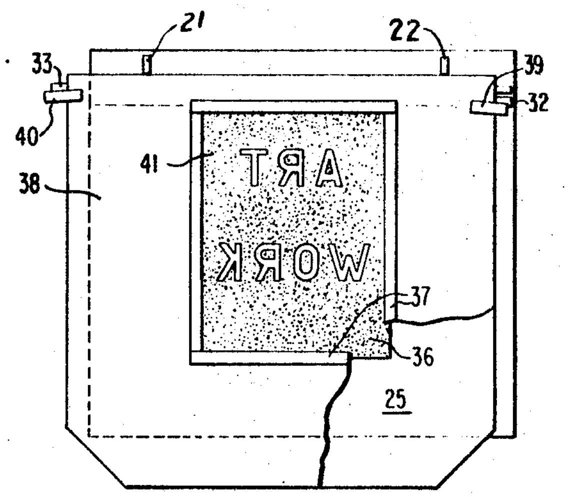
FIG. 7 is a view similar to FIG. 5, showing a step in the preparation of a second flat superimposed upon the first flat, with the second flat photographic negative being positioned in precise registry with the negative on the first completed flat.
Figure 8:
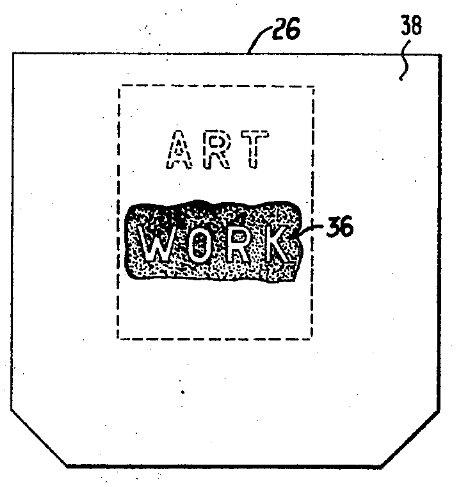
FIG. 8 is a view similar to FIG. 6 showing a portion of the second flat paper cut away in the area where it is necessary for light to penetrate the photographic negative.
Figure 9:
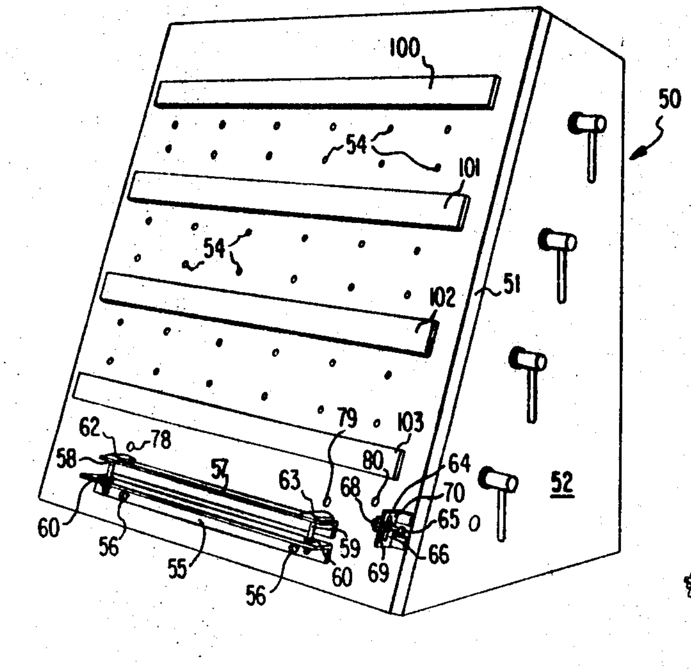
FIG. 9 is a perspective view of the assembly unit of the invention.
Figure 10:
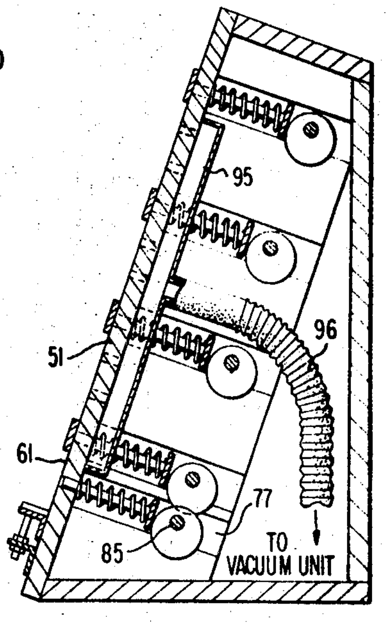
FIG. 10 is an end elevation view, in section, of the structure shown in FIG. 9.
Figure 11:
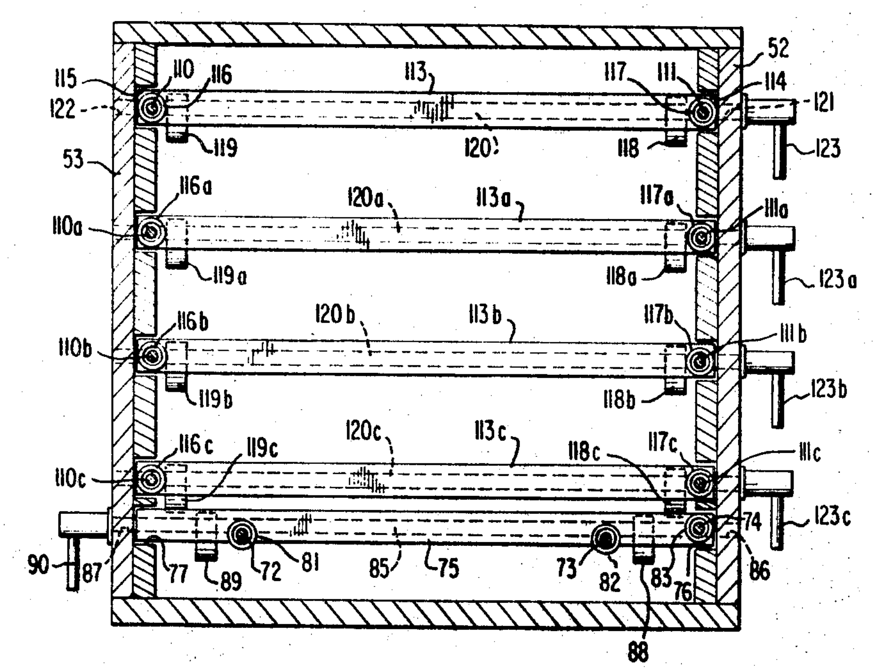
FIG. 11 is another elevation view, in section, of the structure shown in FIG. 9.

A master photographic negative 36 is placed on the sheet 25, emulsion side up, with the image on the negative being carefully aligned with the layout lines which have been drawn in the sheet 25 with the aid of the scales on the light unit table 10. The negative 36 is then firmly secured in place by suitable means, such as strips 37 of adhesive tape. The tape strips 32, 33 are then loosened and the sheet 25 is turned over on the light table, and a portion of the sheet is cut away in the area where it is desired for exposure light to penetrate the negative as shown in FIG. 6.

If additional flats are necessary to make up a complete image, as in a single image requiring two or more burns on one plate, or as in a multiple-color job requiring images on two or more plates, for example, the master flat prepared as described above is again secured on the light table unit 10 in contact with the flat stops. A second sheet of light-blocking paper 38, having its lead and tail edges reinforced as described above, it secured, as by strips 39, 40 of adhesive tape, on top of the first flat with the lead edge and one side edge in contact with the flat stops. The second flat is then prepared in the conventional manner, taking care to secure the second photographic negative 41 in precise registry with the photographic negative 36 on the first flat.

The flats, prepared as described above, are secured in an accurately controlled position on the sensitized surface of a conventional straightedge plate so that the image carried by the flat may be transferred to the plate. This is accomplished by use of the precision assembly apparatus, indicated generally by the reference numeral 50, and illustrated in FIGS. 9 through 14 of the drawings. Assembly apparatus 50 comprises a boxlike frame structure having an inclined front wall 51 and opposed end walls 52, 53, respectively. The front wall 51 has a substantially planar outer assembly surface and is perforated, as at 54, over a substantial portion of its surface to permit air to be drawn therethrough by a vacuum device described more fully hereinbelow.

An angle bracket 55 is rigidly mounted, as by screws 56 on outer or assembly surface 61 of wall 51, along the bottom edge thereof, and a second angle bracket 57 is adjustably supported on bracket 55 by a pair of studs 58, 59 rigidly secured to bracket 57 and supported on bracket 55 as by nuts 60. A pair of flat guides 62, 63 are mounted on adjustable bracket 57, one adjacent each end thereof, in position to contact the lead edge of a flat supported on the assembly surface 61. The spacing of the guides 62, 63 on bracket 57, corresponds to the spacing of the flat stops 21, 22 on light table unit 10.

A third angle bracket 64 is mounted on the surface 61 of wall 51 adjacent one end of the bracket 57, and is supported thereon, as by screw 65, extending through an elongated slot 66 for adjustment toward and away from the bracket 57. A third flat guide 68 is mounted on bracket 64 by a bolt 69 extending through elongated slots 70. Thus, the flat guide 68 may be adjusted both vertically and horizontally with respect to the guides 62, 63, so that the flat guides may be adjusted on the surface 61 while maintaining their desired relative position corresponding to the portion of flat stops.

Three plate guides 72, 73 and 74 are rigidly mounted, as by welding, to an elongated flat guide bar 75 having its opposed ends slidably supported within channels 76, 77 formed on the inner surface of end walls 59, 53 respectively. The plate guides 72, 73 and 74 project into openings 78, 79 and 80, respectively, and are slidably supported therein for movement from a position projecting outwardly from the surface 61 of wall 51 to a position retracted beneath this surface.

The plate stops are resiliently urged toward their retracted position by coil springs 81, 82 and 83 each having one end bearing on the bar 75 and their other end bearing on the bar 75 and their other end bearing on the internal surface of the front wall 51. To move the plate guides to their projected position, against the force of these springs, an elongated shift 85 and has its opposed ends journaled in openings 86, 87 formed in the end walls 52, 53 respectively. A pair of eccentric cams 88, 89 are rigidly supported on the shaft 85, with the cams contacting the flat bar 75 to project the plate guides against the spring force upon rotation of the shaft 85. A lever 90 is rigidly supported on one end of the shaft 85 and projects outwardly from end wall 53 for manual rotation of the shaft 85 to control projection and retraction of the plate stops. The plate guides 72, 73 and 74 are positioned on the bar 75 so that, when the guides a projected, the guides 72, 73 will contact the lead edge of a straightedge plate supported on the surface 61 at fixed, spaced points therealong, and the guide 74 will contact one side edge of the plate at a point adjacent the guide edge.

To releasably retain a straightedge plate in position on the surface 61, a vacuum head or chamber 95 is mounted on the inner surface of wall 51, and is operatively connected, through a conduit 96, to a suitable vacuum source to induce a flow of air through the openings 54 in the wall 51. Suitable valve means, not shown, are provided in the conduit 96 to control the vacuum in the head 95. Thus, when a straightedge plate is positioned on the surface 61 and properly oriented thereon by contact with the plate guides 72, 73 and 74, a vacuum may be applied within the vacuum head 95 which, acting through the openings 54, will firmly hold the straightedge plate in the desired position so that the plate guides may be retracted below the surface 61 of wall 51 to permit subsequent assembly of a flat onto the straightedge plate without interference from the plate guides.

To releasably clamp a flat in position on a straightedge plate on the assembly apparatus 50, a plurality of clamping bars 100, 101, 102 and 103 are supported on and extend across the face of wall 51. The respective clamping bars are resiliently urged into contact with the surface 61 of the wall 51, and means are provided for lifting the clamping bars therefrom to permit the assembly of a straightedge plate and a flat on the assembly surface. Since the respective clamping bars and their respective actuating mechanisms are identical in structure, only the clamping bar 100 and its associated mechanism will be described in detail. In the drawings, similar parts of the respective clamping devices are given similar reference numerals, with the reference numerals designating parts associated with clamping bars 101, 102 and 103 respectively, being indicated by the letters *a*, *b*, and *c*, respectively.

A pair of support rods 110, 111, are rigidly mounted, as by welding, one on each end of the clamping bar 100. The support rods 110, 111 extend through openings (not shown) in wall 51, and have their ends rigidly supported on the opposed ends of a guide bar 113 slidably supported within tracks 114, 115 respectively formed on the inner surfaces of the end plates 52, 53. A pair of coil springs 116, 117 are positioned by the support rod 110, 111, respectively, and extend between the guide bar 113, and the inner surface of wall 51 to resiliently urge the clamping bar 100 into engagement with the assembly surface 61 of wall 51. A pair of eccentric cams 118, 119 are rigidly mounted on elongated shaft 85 journaled for rotation in openings 121, 122, respectively, in the end plates 52, 53 with the cams 118, 119 in contact with the guide bar 113. A lever 123 is rigidly fixed on the rod 120 for manual rotation of the cams 118, 119 to force the support arms 110, 111 and the clamping bar 100 outwardly away from the surface 61 against the resilient force of the springs 116, 117.

Figures 12, 13, 14:
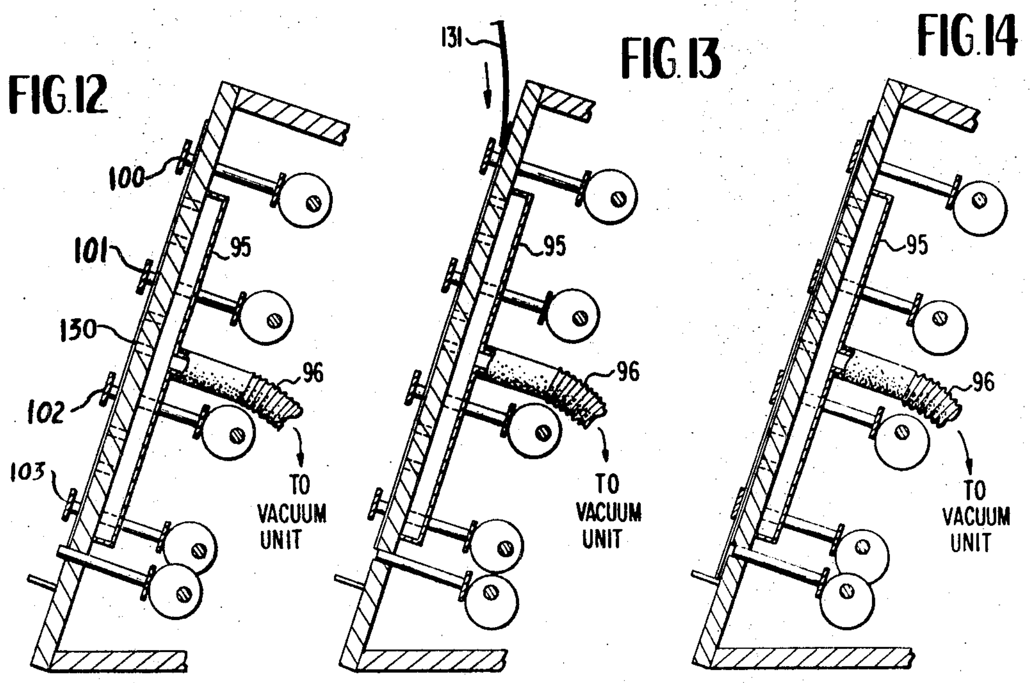
FIG. 12 is a fragmentary sectional view, similar to FIG. 10, and illustrating a straightedge plate supported on the assembly unit.
FIG. 13 is a view similar to FIG. 12 and illustrating a flat being positioned on a straightedge plate on the assembly unit.
FIG. 14 is a view similar to FIGS. 12 and 13 and showing a flat clamped in superimposed portion on a straightedge plate on the assembly unit.

Referring to FIGS. 12 through 14, the operation of the assembly apparatus 50 to assembly a straightedge plate and flat will be briefly described. With the clamping bars 100, 101, 102 and 103 in the raised position out of contact with surface 61 and with the plate guides in the projected position as shown in FIG. 12, a straightedge plate 130 is positioned on the assembly surface 61 of wall 51 with the guide edge and one side edge of the plate in contact with the plate guides on the assembly unit. A vacuum is then applied to the vacuum head 95 to firmly hold the plate 130 in position, and the lever 90 is manually rotated to permit the plate guides to move to the retracted position as shown in FIG. 13. With the clamping bars still in the raised position, a flat 131 is then inserted between the plate 130 and the clamping bars and positioned on the assembly surface 61 with its guide edge and one side edge in contact with the flat guides. With the flat 131 carefully held in this superimposed position on the plate 130, and in contact with the flat guides, the clamping bars are lowered in illustrated in FIG. 14 to firmly clamp and hold the flat in position on the plate. With the flat and plate thus clamped together, the guide and tail edges of the flat may be lifted and firmly secured to the plate by double-faced adhesive tape so that the assembled flat and plate may then be removed from the assembly unit for subsequent processing to transfer the image from the flat to the plate.

Referring now to FIGS. 15 through 18, portions of an offset printing press suitable for use in the practice in the present invention will be described. The plate cylinder or plate segment 140 (hereinafter sometimes referred to as plate segment 140) is mounted on the master cylinder or plate segment wheel 141, (hereinafter sometimes referred to as plate segment wheel 141) by capscrews 142 extending through an elongated slot 143 in the rim portion of the plate segment 140 and into the rim 144 of the plate segment wheel 141. Thus, the plate segment may be adjusted circumferentially around the plate segment wheel 144 to adjust the position of an image (from top to bottom on the printed page) printed from a plate produced in the conventional manner. However, since the method according to the present invention renders such plate segment adjustment unnecessary, a tapered aperture 145 is formed in the rim portion of the plate segment and a corresponding tapered aperture 146 is formed in the rim of the plate segment wheel. To accurately position the plate segment on the plate segment wheel, in the maximum image size printing position, a tool 147 having a tapered end portion 148 is inserted into apertures 145, 146. Thus, the plate segment may be repeatedly moved, removed, and reinstalled on the press in precisely the same position on the plate segment wheel.

The plate segment 140 is provided with a pair of pins, or plate stops 148, 149 projecting radially outward on the clamping surface 150 of the plate segment in position to engage the guide edge of a straightedge plate 130 to position the plate on the plate segment. A third plate stop 151 is provided on the plate segment adjacent the end of the clamped area of the plate 130 in position to engage one side edge of the plate so that the plate stops 148, 149, 151 cooperate to provide a three-point position reference for the plate on the plate segment. With the plate in this position, the plate-clamping bar 152 is clamped tightly onto the plate adjacent the guide edge thereof to firmly secure the guide edge of the plate in an exact guide position on the press and a second bar (not shown) clamps the tail edge of the plate in the conventional manner. The positions of the plate stops 148, 149, 151, respectively on the plate segment correspond precisely to the positions of the plate guides 72, 73, 74 on the assembly apparatus 50 so that the same reference points on the plate 130 are employed to position the plate in the assembly apparatus and on the press.

While the position of the plate guides on the assembly apparatus 50, and the position of the plate stops on the press are fixed, and further while the position of the flat stops on the light table unit and the flat guides on the assembly apparatus are always maintained in a fixed relation, the relative positioning or orientation of the flat guides and plate guides on the assembly apparatus may be varied initially as desired by adjusting the position of the flat guides to thereby alter the position and/or orientation of the image carried by a flat when transferred to the plate. Thus, for a particular press, the relative position of the plate guides and flat guides may be initially adjusted to compensate for any maladjustments of the press, or of any part of the system, so that the printed image will be precisely positioned on the printed paper as was predetermined when the negatives were assembled into a flat on the light table. Thereafter, no press adjustments are necessary and any subsequent plates produced on the apparatus may be installed, or reinstalled, on the press and used to produce a printed job which is always precisely positioned.

Since the meticulous accuracy of the light table has been maintained throughout the process form the light table to the printed image on the paper, through the use of fixed three-point reference positioning of the flat and plate, hairline registry of multicolor and/or multiform printing jobs are readily produced on the press with none of the customary image-positioning operations being necessary on the press.

While I have described and illustrated preferred embodiments of my invention, I wish it understood that I do not intend to be restricted solely thereto, but that I do intend to cover all embodiments thereof which would be apparent to one skilled in the art and which come within the spirit and scope of my invention.

I claim:

1. In an offset printing system in which images carried on straightedge plates are reproduced on paper with ink in an offset printing press, an improved apparatus for preparing the straightedge plates comprising a light table unit having a light surface, a plurality of guidelines formed on said light surface, said guidelines including horizontal lines corresponding to the lead and tail edges of the maximum size image capable of being printed on the offset press with vertical and horizontal scales and three flat stops mounted on and projecting upwardly from said light surface in fixed position relative to said guidelines, said flat stops being oriented with respect to one another and to said guidelines to provide a three-point reference for positioning a sheet of light-blocking material over said guidelines in the production of flats.

2. The apparatus for preparing straightedge plates as defined in claim 1 wherein said guidelines further include a pair of vertical lines cooperating with said horizontal lines to define an area corresponding to the maximum image area of the press, and said flat stops are positioned outboard of said area.

3. The apparatus for preparing straightedge plates as defined in claim 8 further comprising a support including an assembly surface having three plate guides mounted thereon in fixed spaced relation to one another and cooperating to provide a three-point reference for accurately positioning a straightedge plate thereon, three flat guides mounted on said assembly surface in spaced relation to one another and to said plate guides, said flat guides providing a three-point reference for accurately positioning a flat in superimposed relation on a plate which has been positioned by said plate guides, and clamp means for releasably retaining a flat in superimposed relation on a plate on said assembly surface.

4. The apparatus for preparing straightedge plates as defined in claim 3 further comprising means independent of said clamp means for releasably retaining a straight edge plate on said assembly surface in position defined by said plate guides.

5. The apparatus for preparing straightedge plates as defined in claim 4 wherein said plate guides are movable between a projected position extending above said support surface providing a three-point reference for positioning a straightedge plate and a retracted position beneath said assembly surface, and selectively operable means for moving said plate guides between said projected and said retracted position.

6. The apparatus for preparing straightedge plates as defined in claim 4 wherein said means independent of said clamp means for releasably retaining a straightedge plate on said assembly surface comprises a plurality of openings in said support surface, and vacuum means mounted on said support in position to induce a flow of air through said support in a direction tending to retain said plate on said surface.

7. The apparatus for preparing straightedge plates as defined in claim 3 wherein said flat guides are adjustable with respect to said plate guides.

8. The apparatus for preparing straightedge plates as defined in claim 3 wherein the position of said flat guides correspond to the position of said flat stops on said light table unit.

9. The apparatus for preparing straight edge plates as defined in claim 8 wherein the positions of said plate guides on said assembly surface correspond with the positions of three plate guides on the plate cylinder or plate segment of an offset printing press with which the apparatus is to be used.

10. In an offset printing press having a plate segment wheel, a plate segment, means mounting said plate segment on said wheel, and lead and tail edge plate clamps mounted on said plate segment for releasably clamping the lead and tail edges respectively of a straightedge plate on said plate segment, the improvement comprising, a pair of fixed axially spaced and substantially aligned lead edge guides mounted on said plate segment and projecting radially outwardly therefrom beneath said lead edge plate clamp, and a fixed side guide mounted on said plate segment and projecting radially outwardly therefrom adjacent one end of said lead edge plate clamp and circumferentially offset from said lead edge guides, said side guide being positioned to engage one side edge of a straightedge plate when the plate is installed on said plate segment with the lead edge in engagement with said lead edge guides, said lead edge and said guides cooperating to provide a fixed three-point reference for accurately positioning a straightedge plate on said plate segment.

11. In an offset printing press as defined in claim 10, the further improvement comprising, guide means for accurately positioning said plate segment on said plate segment wheel in its maximum image size printing position.

12. The offset printing press as defined in claim 11, wherein said guide means comprises a tapered opening in said plate segment, a tapered opening in said plate segment wheel in axial and radial alignment with said tapered opening in said plate segment when said plate segment is installed in its maximum image size printing position, and removable taper pin means insertable into said tapered openings to accurately position said plate segment on said plate segment wheel.

UNITED STATES PATENT OFFICE
CERTIFICATE OF CORRECTION

Patent No. 3,577,856 Dated May 11, 1971

Inventor(s) Edward R. Updegraff

It is certified that error appears in the above-identified patent and that said Letters Patent are hereby corrected as shown below:

Column 9, line 5, delete "8" and insert --1--.

Signed and sealed this 10th day of August 1971.

(SEAL)
Attest:

EDWARD M.FLETCHER,JR.
Attesting Officer

WILLIAM E. SCHUYLER, JR.
Commissioner of Patents

FORM PO-1050 (10-69)

USCOMM-DC 60376-P69
☆ U.S. GOVERNMENT PRINTING OFFICE : 1969 O—366-334